United States Patent Office 3,396,149

Patented Aug. 6, 1968

3,396,149

PRODUCTION OF MIXED POLYESTERS FROM THE DIGLYCOL ESTERS OF AROMATIC DICARBOXYLIC ACIDS AND PHOSPHORIC ACID

Hilmar Roedel, Elsenfeld, and Erhard Siggel, Laudenbach (Main), Germany, assignors to Vereinigte Glanzstoff-Fabriken AG., Wuppertal-Elberfeld, Germany No Drawing. Filed Mar. 8, 1963, Ser. No. 263,727
Claims priority, application Germany, Mar. 10, 1962, V 22,166
15 Claims. (Cl. 260—75)

The present invention is concerned with the production of a mixed polyester in which the diglycol ester of an aromatic dicarboxylic acid is polycondensed with the addition of relatively large amounts of phosphoric acid. More particularly, the invention is directed to the mixed polyester product and its incorporation in a fiber-forming polyester by a process which leads to a fibrous or filamentary product having improved properties.

The production of fiber-forming, linear, saturated polyesters is well known in the art, polyethylene terephthalate being the most common commercial product of this type. In general, the fiber-forming polyester is obtained by polycondensing the diglycol ester of an aromatic dicarboxylic acid, the diglycol ester usually being obtained by transesterification of a lower alkyl ester of the aromatic dicarboxylic. For example, polyethylene terephthalate is produced by first carrying out an ester interchange between dimethyl terephthalate and ethylene glycol in the presence of a metal transesterification catalyst, and subsequently polycondensing the diglycol ester in the presence of a polymerization catalyst to produce the fiber-forming polyester. In addition to terephthalic acid or its dimethyl ester and ethylene glycol as the initial reactants, a number of other aromatic dicarboxylic acids and glycols have been discussed in detail in the prior art, and it is sometimes desirable to use mixtures of such initial reactants. In general, the aromatic dicarboxylic acids are those of the benzene or naphthalene series in which the two carboxylic acid groups are substituted on an aromatic nucleus and separated from each other by a hydrocarbon chain of not fewer than 4 carbon atoms. The glycols usually employed as initial reactants can be designated by the general formula $HOCH_2—(CH_2)_n—CH_2OH$, where $n$ is an integer of from 0 to 6. Glycols of this type may also be defined as aliphatic or cycloaliphatic glycols containing from 2 to 8 carbon atoms in a saturated linear hydrocarbon structure between the functional hydroxy groups. For economic reasons, ethylene glycol is most commonly employed, but the diglycol ester may also be formed from such substances as propylene glycol, butylene glycol or dimethylol-cyclohexane. The alkylene glycols of 1 to 4 carbon atoms are especially preferred.

In producing fiber-forming polyesters, one known practice is to add phosphoric acid in very small amounts to the aromatic dicarboxylic acid-diglycol esters during their polycondensation. This addition of phosphoric acid is carried out in order to inactivate the metal transesterification catalysts which are normally employed to accelerate the preceding ester interchange reaction between the dialkyl ester such as dimethyl terephthalate and the glycol such as ethylene glycol. The amount of phosphoric acid which has been added for this purpose is carefully adjusted so as not to exceed the functionally equivalent amount of the ester interchange catalyst present in the reaction mixture.

It has been found, however, that even this small addition of phosphoric acid to the diglycol ester interchange mixture considerably retards the speed or rate of the polycondensation reaction. Thus, the presence of only 0.05% by weight of phosphoric acid in the reaction mixture is sufficient to triple the time required for polycondensation. With even a greater addition of phosphoric acid up to about 1% by weight with reference to the reaction mixture, it has been observed that the retardation effect on the speed of polycondensation is so great as to make it practically impossible for commercial purposes to obtain mixed polyesters of a high molecular weight.

Furthermore, when polycondensing the diglycol ester with up to about 1% by weight of phosphoric acid, side-reactions become quite predominant and lead to cross-linking and an accumulation of reaction products which, in spite of their high melting viscosity, have relatively short chain lengths and are highly brittle in the solid state. Such polyester products are not at all suitable for extrusion or shaping into fibers, filaments, films or the like. Aside from the overwhelming difficulties in shaping such polyester material, the molded products do not have the high tensile strength or similar desirable properties which are normally characteristic of the fiber-forming polyesters derived from aromatic dicarboxylic acid-diglycol esters.

Surprisingly, it has now been found in accordance with the present invention that relatively large amounts of phosphoric acid, e.g. at least 2% by weight or more, do not delay or retard the reaction speed during the polycondensation of the aromatic dicarboxylic acid-diglycol esters. Instead, the reaction speed is accelerated to such an extent that no polycondensation catalysts are required. Therefore, it becomes economically feasible to produce a mixed polyester by the addition of at least two up to 15% by weight of phosphoric acid, and although the resulting polyester product is not suitable for the formation of fibers or films, it has also been found in accordance with this invention that the mixed ester product containing phosphoric acid can be employed as a modifying additive for improving the usual polycondensation of aromatic dicarboxylic acid-diglycol esters into a fiber-forming polyester.

One object of the present invention is to provide a process for the production of a mixed polyester from diglycol esters of aromatic dicarboxylic acids with the intercondensation of a relatively large amount of phosphoric acid. Another object of the invention is to provide the mixed polyester product containing phosphoric acid as an intermediate additive having a high degree of utility in the preparation of fiber-forming polyesters such as polyethylene terephthalate. In particular it is a special object of the invention to provide a novel and improved process for the production of fiber-forming polyesters which will lead to a filamentary polyester product having excellent physical properties and an improved receptivity for dyes. These and other objects and advantages of the invention will become more apparent upon consideration of the following detailed description.

The first step of the present invention requires the production of a mixed polyester by polycondensing an aromatic dicarboxylic acid-diglycol ester in admixture with at least two up to about 15% by weight of phosphoric acid. With this relatively large amount of phosphoric acid, the rate of polycondensation is quite rapid with the phosphoric acid being intercondensed to form a mixed polyester product.

For example, an addition of 5% by weight of phosphoric acid to the diglycol ester reaction mixture will cause the polycondensation to be completed in about half the time which is normally required for the polycondensation of aromatic dicarboxylic acid-diglycol esters in the absence of phosphoric acid but in the presence of the usual metal transesterification catalysts such as antimony trioxide. The following table clearly indicates the criticality of adding at least 2% by weight of phosphoric acid when producing mixed polyesters with diethylene glycol terephthalate. In all cases, the diethylene glycol terephthlate reaction mixture was identical and contained antimony trioxide from the preceding transesterification reaction. Also, the polycondensation was carried out in each case so as to obtain a polymer having a melt viscosity of approximately 5000 poise.

TABLE

| Amount of admixed phosphoric acid percent by weight | Polycondensation time |
|---|---|
| 0 | 2 hours 0 minute. |
| 0.05 | 5 hours 55 minutes. |
| 0.3 | 6 hours 15 minutes. |
| 0.5 | 6 hours 30 minutes. |
| 1.0 | 3 hours 0 minute. |
| 2.0 | 1 hour 50 minutes. |
| 3.0 | 1 hour 30 minutes. |
| 5.0 | 0 hour 50 minutes. |
| 10.0 | 0 hour 30 minutes. |
| 15.0 | 0 hour 28 minutes. |

For the production of a fiber-forming polyester in accordance with the invention, the polycondensation of the diglycol ester of an aromatic dicarboxylic acid, such as diethylene glycol terephthalate, is carried out in the usual manner but with the addition of the above-noted preformed mixed polyester obtained by polycondensing an aromatic dicarboxylic acid-diglycol ester with at least two up to about 15% by weight of phosphoric acid. The amount of the mixed polyester being added to the polycondensation reaction mixture must be adjusted such that the final fiber-forming polyester product contains not more than about 1% by weight of phosphoric acid. In general, the amount of phosphoric acid in the final product should be maintained between about 0.05 to 1%, preferably 0.3 to 0.8%, by weight with reference to the total weight of the fiber-forming polyester. The final product is also a mixed polyester containing phosphoric acid, but for purposes of definition, this final product is referred to herein as the "fiber-forming polyester," and it will be understood that the polycondensation reaction for the production of a fiber-forming polyester is carried out for a period of time sufficient to give the usual high molecular weight required of fibrous polymers. The term "mixed polyester" is employed herein with reference to the preformed polyester additive containing 2 up to 15% by weight of phosphoric acid, this product being characterized by its hard, brittle and non-fibrous properties such as a very low tensile strength.

In producing the fiber-forming polyester, the mixed polyester containing 2–15% by weight of phosphoric acid can be added to the aromatic dicarboxylic acid-diglycol ester prior to polycondensation or at the beginning up to the first half, preferably the first third, of the polycondensation reaction. The addition of the mixed polyester should be accomplished so as to obtain a uniform mixture during the polycondensation reaction.

It was surprisingly found that in contrast to the addition of phosphoric acid itself, the mixed polyester added in accordance with the process of this invention do not retard the condensation reaction of the usual diglycol esters of aromatic dicarboxylic acids. The fiber-forming polyester modified in this manner with up to about 1% by weight of phosphoric acid are obtained in a normal period of reaction time, and the side reactions caused by even small amounts of phosphoric acid itself, as described above, occur only to a slight extent. The final fiber-forming polyester product is neither yellowed nor friable, and this polyester product can be easily molded by conventional methods. For example, a conventional melt-spinning process yields filaments or fibers which have a high tensile strength and which have the same resistance to chemicals as do the unmodified polyesters.

As the initial materials for the mixed polyester which is first prepared from an aromatic dicarboxylic acid-diglycol ester and at least 2% by weight of phosphoric acid, the same dicarboxylic acids and glycols may be employed as those which are normally used in preparing a fiber-forming polyester. Thus, where the final fiber-forming polyester product is to be polyethylene terephthalic acid and ethylene glycol are most suitable as a matter of convenience in the initial preparation of the mixed polyester with phosphoric acid. However, other aromatic dicarboxylic acids and glycols or mixtures thereof are also suitable, and it is also possible to use a a mixture of diglycol esters in preparing the mixed polyester. For example, other useful aromatic dicarboxylic acids include the following: 1,5-naphthalene dicarboxylic acid; 2,6-naphthalene dicarboxylic acid; 2,7-naphthalene dicarboxylic acid; 4,4'-diphenyl dicarboxylic acid; 4,4'-diphenyl methane dicarboxylic acid; and 1,4-cyclohexane dicarboxylic acid.

The preferred glycols are the saturated aliphatic glycols, for example the alkylene glycols of 2 to 6 carbon atoms and especially ethylene glycol, propylene glycol and butylene glycol. Saturated cycloaliphatic glycols such as 1,4-dimethylol cyclohexane may also be employed.

The diglycol esters of aromatic dicarboxylic acids are preferably obtained from the corresponding dialkyl esters of these acids, e.g. the dimethyl esters, by ester interchange in the presence of a conventional metal, metal oxide or metal salt catalyst at temperatures of about 160° C. to 200° C. The phosphoric acid can then be added directly to the ester-interchange reaction mixture containing the diglycol ester product, either before, at the beginning of or even during the polycondensation reaction. It is also possible to permit the ester-interchange mixture containing the diglycol ester to solidify and store it for a period of time before its use in the polycondensation reaction. The solid diglycol ester is then first liquefied before the addition of the phosphoric acid. Likewise, a solid or molten diglycol ester such as diethylene glycol terephthalate can be obtained from any other conventional source, and the phosphoric acid added prior to or during the polycondensation reaction. In each case, the phosphoric acid is advantageously added to the diglycol ester in the form of a concentrate or as a solution in water or a glycol or mixtures thereof.

The polycondensation of the diglycol ester with the phosphoric acid can be carried out without any difficulty according to conventional practice in the production of unmodified polyesters, preferably at elevated temperatures above the boiling point of the glycol and up to about 260° C., preferably up to about 240° C. It is unnecessary to add any special condensation catalyst when using the prescribed amount of phosphoric acid. In general, it is preferred to carry out this polycondensation to form a mixed polyester in which substantially all of the phosphoric acid has been intercondensed. The mixed polyester product preferably contains about 5% to 10% by weight of the phosphoric acid. Polycondensation should be carried out for a period of time sufficient to give a solid mixed polyester product at normal temperatures, and it is most convenient to continue the polycondensation until no further glycol is liberated. Suitable mixed polyesters of the bis-glycol esters intercondensed with phosphoric acid should generally have a melt viscosity of approximately 1800 to 12,000 poise.

Optimum results are often achieved in carrying out the process and obtaining the products of the present invention if the mixed polyester is prepared by condensation in the presence of an alkali metal hydroxide such as sodium hydroxide or potassium hydroxide. It is preferred to add a small amount of the alkali hydroxide prior to the condensation reaction and before the addition of the phosphoric acid. For example, the alkali hydroxide can be added to the bis-glycol ester of the aromatic dicarboxylic acid as obtained directly from the ester interchange. The phosphoric acid may then be added to the molten reaction mixture before or during the actual polycondensation, preferably before polycondensation in order to obtain a uniformly mixed reaction medium. The amount of the alkali hydroxide additive should be regulated such that not more than one hydrogen atom of the phosphoric acid additive is neutralized during the polycondensation reaction. The alkali hydroxide is most conveniently added in the form of a 2 N solution in glycol or water. The addition of this alkali hydroxide is especially desirable because it results in a higher softening point of the final fiber-forming polyester product.

The mixed polyester containing 2–15%, preferably 5–10%, by weight of phosphoric acid is a very friable material and can be readily pulverized into relatively small particles or granules. In preparing the fiber-forming polyester, the mixed polyester is preferably employed in this pulverized form in order to reduce the time required to obtain a uniform mixing of the polycondensation reactants. This colorless and pulverized mixed polyester is best characterized for the purpose of this invention as an intermediate product which can be used as a modifying additive in order to improve the properties of a fiber-forming polyester.

The second step of this invention requires the formation of a fiber-forming polyester by the conventional practice of polycondensing the diglycol ester of an aromatic dicarboxylic acid, but with the addition of the above-described mixed polyester in an amount such that the final product contains not more than 1% by weight of the phosphoric acid condensed into the polymer. With respect to the aromatic dicarboxylic acid-diglycol ester reactant, it will be apparent that the same compounds can be employed as in the preparation of the mixed polyester containing phosphoric acid. In general, however, commercial fiber-forming polyesters are most conveniently obtained when using diethylene glycol terephthalate as the initial reactant, and the present invention is therefore especially directed to the modification of this compound during its formation into polyethylene terephthalate. However, fiber-forming polyesters have also been prepared from the bis-glycol esters of naphthalene dicarboxylic acids or other aromatic dicarboxylic acids when used alone or in combination with bis-ethylene glycol terephthalate. While it may be more convenient to use the same diglycol esters in preparing both the mixed polyester and the fiber-forming polyester, this procedure is not required for the purpose of the present invention. Thus, the present invention contemplates the use of various mixtures, not only with respect to individual acids and glycols but also with respect to different bis-glycol esters in the mixed polyester and in the fiber-forming polyester.

As previously noted, the mixed polyester is added to the second polycondensation reaction mixture prior to, at the start of or during the first half, preferably the first third, of the actual polycondensation reaction. Also, the mixed polyester is added in an amount such that the phosphoric acid content of the final fiber-forming polyester product does not exceed about 1.0% by weight, and is preferably an amount of about 0.3 to 0.8% by weight.

The second polycondensation step of the invention begins by incorporating the pulverized or granulated mixed polyester into a molten reaction mass of the fiber-forming aromatic dicarboxylic acid-bis-glycol ester reactant. The pulverized additive then dissolves completely in this reaction mass in a relatively short period of time, and intimate mixing of the resulting reaction mixture can be accomplished by mechanical agitation. The polycondensation is carried out in a conventional pressure-tight vessel in which the reaction material can be suitably mixed and agitated as in the known processes. This second polycondensation is also carried out under conventional reaction temperatures and reduced pressures, usually in the presence of an inert atmosphere. Also, the reaction can be accelerated with known condensation catalysts such as antimony trioxide. The polycondensation is completed at any desired point which will provide a high molecular weight product suitable for such commercial purposes as the formation of filaments, films or other extruded or molded products.

The following examples will serve to further explain the process of the invention, and it will be understood that these examples are illustrative only and not intended as excluding equivalent processes. Parts and percentages are by weight unless otherwise indicated. Viscosity is measured in all cases as a 1% solution in m-cresol at at 20° C. Paragraph (a) of each example illustrates the preparation of the mixed polyester with at least 2% by weight by phosphoric acid, and paragraph (b) is directed to the preparation of the fiber-forming polyester as modified by the previously prepared mixed polyester.

Example 1

(a) 50 kg. of dimethyl terephthalate were first ester-interchanged with 45 kg. of ethylene glycol in the presence of 0.015% by weight of zinc acetate in an agitator equipped autoclave at temperatures of 160° C. to 200° C. so as to form bis-ethylene glycol terephthalate while distilling-off the liberated methanol within a period of 2 hours. After further distillation of about 16 liters of ethylene glycol, there resulted an ester-interchange product with a solution viscosity of 1.15 (measured as 1% solution in m-cresol at 20° C.). To this ester-interchange product as a reaction mixture, there were then added 4.9 kg. of phosphoric acid dissolved in 2 kg. of ethylene glycol and a vacuum was applied to the autoclave. Within 30 minutes the pressure in the reaction vesssel fell to 1 mm. Hg. The temperature, in the meantime, was increased and toward the end of the necessary 30 minute condensation time reached 240° C. The finished polyester containing about 10% of phosphoric acid was extruded as a band, solidified in water and broken up into small particles. This mixed polyester was obtained in an entirely colorless state and had a melting range of 200°–210° C. An analysis of the product yielded 9.9% by weight of $H_3PO_4$ in the polymer.

(b) 94 kg. of dimethyl terephthalate were ester-interchanged with 89 kg. of ethylene glycol in the presence of 0.15% by weight of zinc acetate and 0.02% by weight of antimony trioxide in an agitator-equipped autoclave at 160°–200° C., so as to form bis-ethylene glycol terephthalate while distilling off the liberated methanol within a period of 2 hours. There were then additionally removed from the reaction material by distillation approximately 33 liters of ethylene glycol. To this ester-interchange product as a reaction mixture, there were then added together with mechanical agitation 4.9 kg. of the bis-ethylene glycol terephthalate-phosphoric acid mixed polyester containing 10% by weight of phosphoric acid, as described under (a). The additive d issolved within 10 minutes in the reaction mass. Vacuum was applied and within 45 minutes a pressure was attained of 0.2 to 0.5 mm. Hg. After 1½ hours, during which the temperature was increased to 275° C., the condensation was terminated. The resulting fiber-forming mixed polyester, containing phosphoric acid in an amount of about 0.5% by weight, had a solution viscosity of 1.43 and a softening point of 246° C. Analytic $H_3PO_4$ determination exhibited 0.47% $H_3PO_4$ in the condensate.

Example 2

(a) In the same manner as described in Example 1(a), an ester-interchange mixture was produced from 50 kg. of dimethyl terephthalate and 45 kg. of ethylene glycol. Before the beginning of condensation, 0.34 kg. of NaOH were added in the form of a 2 N aqueous solution. After intensive mixing of the NaOH into the reaction medium, a vacuum was applied and within 15 minutes was brought to a reduced pressure of 500 mm. Hg. 2.5 kg. of phosphoric acid were then added as a solution in 2 kg. of ethylene glycol, and within 30 minutes the reaction vessel was evacuated to 0.3 to 0.5 mm. Hg. The temperature was slowly raised to 240° C., this temperature being maintained until the end of the condensation (about 45 minutes). The condensate, containing about 5% of $H_3PO_4$, was extruded, solidified and ground into particles. The condensate had a softening point of 220–225° C. Analysis exhibited 4.5% of phosphoric acid in the polymer.

(b) In the same manner as described in Example 1(b), using 90 kg. of dimethyl terephthalate and 89 kg. of ethylene glycol with the addition of 10 kg. of the polyester containing 5% phosphoric acid as described under (a), a fiber-forming mixed polyester was prepared which contained about 0.5% by weight of phosphoric acid and had a softening point of 250° C. In the polycondensate, 0.45% of phosphoric acid was analytically detected. This polycondensate had a solution viscosity of 1.41 and could be spun from the melt witout difficulty into filaments of an individual denier of 3. The filaments had a tensile strength of 33 Rkm. at an elongation of 45%.

(c) In a manner analogous to that described under (b), a polycondensate was prepared with a solution viscosity of 1.62, and this polyester product was granulated and spun from the melt into filaments with an individual denier of 3. The resulting filaments had a solution viscosity of 1.75 and a tensile strength of 41 Rkm. at 43% breaking stretch. (The abbreviation "Rkm." stands for Reisskilometer, one unit Rkm. being equal to 9 grams per denier.)

Example 3

(a) 100 g. of p,p'-diphenyl dicarboxylic acid dimethyl ester were ester-interchanged with 92 g. of ethylene glycol in the presence of 0.025% of zinc acetate in an agitator-equipped autoclave at a temperature of 160° C. to 210° C. while splitting off 23.5 g. of methanol (i.e. about 30 ml. of methanol). After the methanol was removed, 50 g. of the glycol were split off and the temperature raised to 220°–225° C. There were now added 10 g. of crystalline phosphoric acid dissolved in 5 ml. of ethylene glycol. After the phosphoric acid was mixed in, the pressure in the vessel was reduced over a 20 minute period to 0.5 mm. Hg, and the temperature was slowly brought to 240° C., this temperature being maintained to the end of the condensation reaction.

The mixed polyester condensate had a softening point of 228°–230° C. A phosphoric acid determination showed 9.6% $H_3PO_4$ in the condensate.

(b) 150 g. of dimethyl terephthalate were ester-interchanged in the presence of 0.015% of zinc acetate and 0.02% of antimony trioxide with 150 g. of ethylene glycol while splitting off 49 g. of methanol at a temperature of 160° C. to 200° C. Then, while raising the temperature to 220° C., 63 g. of ethylene glycol were distilled off. 7.8 g. of the ground product obtained in Example 3(a) were then added to the ester-interchange product. Within 30 minutes, the pressure was reduced to 0.5 mm. Hg and, with further splitting off and removal of the glycol, the temperature was elevated to 280° C., and condensation was carried out over a period of 1½ hours to a solution viscosity of 1.60. The resulting fiber-forming polyester contained 0.48% $H_3PO_4$ and had a softening point of 245° C.

Example 4

(a) 100 g. of 2,6-naphthalene dicarboxylic acid dimethyl ester were ester-interchanged with 75 g. of ethylene glycol in the presence of 0.015% of zinc acetate at a temperature of 175° C. to 200° C. while splitting off methanol. By increasing the temperature up to 230° C., there were then distilled off 31 g. of the glycol. 5 g. of phosphoric acid dissolved in 5 ml. of ethylene glycol were stirred into the melt, and during a period of 20 minutes, the reaction vessel was brought to a vacuum of 0.5 mm. Hg. While maintaining the temperature at 235° C., condensation was completed with further splitting off and removal of glycol (within a period of 40 minutes). The polycondensate in the form of a mixed polyester had a melting point of 208°–210° C. A phosphoric acid determination showed 5.1% $H_3PO_4$ in the polycondensate.

(b) 150 g. of terephthalic acid dimethyl ester were ester-interchanged in the presence of 0.015% of zinc acetate and 0.02% of antimony trioxide with 150 g. of ethylene glycol while splitting off 49 g. of methanol at 160° C. to 200° C. With further temperature elevation to 225° C., 63 g. of the glycol were distilled off. 15 g. of the particulated mixed polyester product as obtained from 4(a) were then dissolved in the melt, and the reaction mixture was brought to a vacuum of 0.5 mm. Hg over a period of 30 minutes. The temperature was then elevated to 280° C. within 2 hours, and the condensation was carried out with removal of the glycol to a solution viscosity of 1.68. The resulting polyester contained 0.47% of $H_3PO_4$.

Example 5

(a) 100 g. of terephthalic acid dimethyl ester were ester-interchanged in the presence of 0.015% of zinc acetate at a temperature of 160° C. to 200° C. with 20 g. of 1,4-dimethylol cyclohexane and 80 g. of ethylene glycol while splitting off 32 g. of methanol. After all the methanol had distilled off, the temperature was increased to 220° C. and 30 g. of ethylene glycol were distilled off. 10 g. of phosphoric acid dissolved in 5 ml. of ethylene glycol were now added and, while agitating the reaction mixture raising the temperature to 235° C., a further 10 g. of the glycol were distilled off. Continuing the agitation of the molten reaction mixture, 1.3 g. of NaOH were introduced as a 2 N aqueous solution. With a temperature increase to 250° C. and under application of a vacuum of 0.5 mm. Hg, condensation was carried out for 50 minutes to a solution viscosity of 1.61.

The mixed polyester product had a melting point of 217°–220° C. and contained 7.5% $H_3PO_4$.

(b) 150 g. of terephthalic acid dimethyl ester were ester-interchanged in the presence of 0.015% of zinc acetate and 0.02% of antimony trioxide with 150 g. of ethylene glycol while splitting off methanol at a temperature of 160° C. to 200° C. Thereupon, while raising the temperature to 225° C., a total of 65 g. of ethylene glycol were distilled off. 10 g. of finely divided mixed polyester as obtained in 5(a), containing 7.5% phosphoric acid, were then added. Within 30 minutes a vacuum of 0.5 mm. Hg was established and additional glycol was split off under a temperature rise to 280° C. Within 1 hour and 50 minutes, the reaction mixture was condensed to a solution viscosity of 1.62. The softening point of the resulting fiber-forming polyester was measured as 255° C.; and this polycondensate contained 0.48% $H_3PO_4$.

The fiber-forming polyester containing less than 1% by weight phosphoric acid and produced according to the process of this invention is most advantageously employed as a textile material, i.e. as a filament, fiber, thread, yarn, fabric or the like. This modified polyester is readily melted, spun and stretched under the same conditions that are commonly used in the production of filaments from unmodified polyesters. The resulting modified polyester filaments, in continuous or staple form, have a relatively high tensile strength and good abrasion resistance. Furthermore, the modified polyester filaments have the same chemical resistance, i.e. resistance to acids, alkalies and oxidizing agents, as do filaments of polyesters which are free of phosphoric acid. Accordingly, it is possible to dye the modified filaments by the usual methods of dyeing polyesters without any special precautionary measures.

The modified polyester filaments produced by this invention are especially distinguished by their capability of being dyed with basic dyestuffs in deep shades without using a carrier. By comparison, the unmodified polyesters generally require the use of a carrier, which acts as a swelling agent, in order to provide good penetration of the fiber and a rapid dyeing. Surprisingly, the modified polyester filaments of this invention can also be very deeply dyed with the so-called dispersion dyestuffs, again without the use of a carrier or swelling agent, and the resulting product is even more deeply dyed than are filaments of an unmodified polyester which have been dyed in the presence of a carrier.

Yarns and fabrics made from the modified polyester fibers have an extremely low tendency toward piling and exhibit excellent wearing properties. In general, textile products produced from the modified polyesters of this invention exhibit not only the desirable properties of prior products but also some additional advantageous properties which could not be satisfactorily attained in the prior art.

The invention is hereby claimed as follows:

1. A process for the production of a mixed polymeric polyester which comprises polycondensing monomers consisting essentially of (a) the bis-glycol ester of an aromatic dicarboxylic acid in admixture with (b) at least 2 up to about 15% by weight of phosphoric acid with reference to said bis-glycol ester, the glycol component of said ester being selected from the group consisting of aliphatic and cycloaliphatic glycols of 2 to 8 carbon atoms in a saturated linear hydrocarbon structure between two functional hydroxy groups and the dicarboxylic acid component of said ester containing its two carboxylic acid groups substituted on an aromatic nucleus and separated from each other by a hydrocarbon chain of at least 4 carbon atoms.

2. A process as claimed in claim 1 wherein the glycol component is ethylene glycol and the dicarboxylic acid component is terephthalic acid.

3. A process as claimed in claim 1 wherein the glycol component is a mixture of 1,4-dimethylol-cyclohexane and ethylene glycol and the dicarboxylic acid component is terephthalic acid.

4. A process as claimed in claim 1 wherein said polycondensation is carried out at a temperature above the boiling point of the glycol up to about 260° C.

5. A process as claimed in claim 1 wherein said bis-glycol ester is interconnected with said phosphoric acid to yield a mixed polyester product having a melt viscosity of approximately 1800 to 12,000 poise.

6. A process as claimed in claim 1 wherein said polycondensation is carried out in the presence of a small amount of alkali hydroxide.

7. A process as claimed in claim 1 wherein about 5 to 10% of the phosphoric acid is condensed into the mixed polyester, with reference to the total weight of the final product.

8. The mixed polymeric polyester product obtained by the process of claim 1 in which said polycondensation has been carried out at a temperature above the boiling point of the glycol up to about 260° C. until the mixed polymeric polyester product has a melt viscosity of approximately 1800 to 12,000 poise.

9. In a process for the production of a fiber-forming polyester by polycondensation of the bis-glycol ester of an aromatic dicarboxylic acid wherein the glycol of said ester is selected from the group consisting of aliphatic and cycloaliphatic glycols of 2 to 8 carbon atoms in a saturated linear hydrocarbon structure between two functional hydroxy groups and the acid of said ester is an aromatic nucleus bearing two carboxylic acid substituents separated from each other by a hydrocarbon chain of at least 4 carbon atoms, the improvement comprising: polycondensing into said fiber-forming polyester (1) said bis-glycol ester of an aromatic dicarboxylic acid in admixture with (2) a preformed mixed polymeric polyester obtained by polycondensing monomers consisting essentially of (a) the bis-glycol ester of an aromatic dicarboxylic acid wherein said glycol and said acid components of the ester are as defined above with (b) at least 2 up to about 15% by weight thereof of phosphoric acid, said preformed mixed polymeric polyester (2) being added to said bis-glycol ester (1) in an amount such that the final fiber-forming polyester product contains not more than about 1% by weight of said phosphoric acid.

10. A process as claimed in claim 9 wherein said mixed polyester (2) is added in an amount such that the final fiber-forming polyester product contains about 0.3 to 0.8% by weight of phosphoric acid.

11. A process as claimed in claim 9 wherein the mixed polyester additive (2) is obtained by polycondensing said aromatic dicarboxylic acid-bis-glycol ester with said phosphoric acid in the presence of a small amount of alkali hydroxide.

12. A process as claimed in claim 11 wherein the mixed polyester additive (2) contains about 5 to 10% by weight of phosphoric acid.

13. A process as claimed in claim 9 wherein said preformed mixed polyester (2) is obtained by polycondensation of the bis-ethylene glycol ester of terephthalic acid with said phosphoric acid.

14. A process as claimed in claim 13 wherein the bis-ethylene glycol ester of terephthalic acid as component (1) is polycondensed to form a fiber-forming polyester with the addition of said preformed mixed polyester (2).

15. The fiber-forming polyester product obtained by the process of claim 9.

References Cited

UNITED STATES PATENTS

| | | | |
|---|---|---|---|
| 3,028,366 | 4/1962 | Engle et al. | 260—75 |
| 3,070,578 | 12/1962 | Heuck et al. | 260—75 |
| 3,134,744 | 5/1964 | Starck et al. | 260—75 |
| 2,197,855 | 4/1940 | Ellis | 260—75 |
| 2,479,951 | 8/1949 | Marling | 260—22 |

FOREIGN PATENTS

| | | |
|---|---|---|
| 874,210 | 8/1961 | Great Britain. |
| 567,821 | 12/1958 | Canada. |
| 586,816 | 12/1958 | Italy. |
| 769,220 | 3/1957 | Great Britain. |

WILLIAM H. SHORT, *Primary Examiner.*

LOUISE P. QUAST, *Assistant Examiner.*

UNITED STATES PATENT OFFICE
CERTIFICATE OF CORRECTION

Patent No. 3,396,149 August 6, 1968

Hilmar Roedel et al.

It is certified that error appears in the above identified patent and that said Letters Patent are hereby corrected as shown below:

Column 4, line 2, after "polyethylene" insert -- terephthalate --. Column 9, line 37, "interconnected" should read -- intercondensed --.

Signed and sealed this 17th day of March 1970.

(SEAL)
Attest:

Edward M. Fletcher, Jr.
Attesting Officer

WILLIAM E. SCHUYLER, JR.
Commissioner of Patents